(12) United States Patent
Chandrasekarasastry et al.

(10) Patent No.: US 8,996,478 B2
(45) Date of Patent: Mar. 31, 2015

(54) MIGRATING DEDUPLICATED DATA

(71) Applicant: NetApp, Inc., Sunnyvale, CA (US)

(72) Inventors: Nagesh Panyam Chandrasekarasastry, Bangalore (IN); Atish Kathpal, Bareilly (IN); Gaurav Makkar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 193 days.

(21) Appl. No.: 13/655,287

(22) Filed: Oct. 18, 2012

(65) Prior Publication Data

US 2014/0114933 A1 Apr. 24, 2014

(51) Int. Cl.
G06F 17/30 (2006.01)
G06F 12/02 (2006.01)

(52) U.S. Cl.
CPC .................................. *G06F 12/02* (2013.01)
USPC ......................................................... 707/692

(58) Field of Classification Search
None
See application file for complete search history.

(56) References Cited

U.S. PATENT DOCUMENTS

| 5,905,911 | A | 5/1999 | Shimizu |
| 7,076,622 | B2 | 7/2006 | Hsu et al. |
| 7,921,077 | B2 | 4/2011 | Ting et al. |
| 8,086,799 | B2 | 12/2011 | Mondal et al. |
| 8,099,571 | B1 | 1/2012 | Driscoll et al. |
| 8,407,190 | B2 * | 3/2013 | Prahlad et al. ................ 707/692 |
| 2002/0103969 | A1 | 8/2002 | Koizumi et al. |
| 2010/0088296 | A1 | 4/2010 | Periyagaram et al. |
| 2010/0332454 | A1 | 12/2010 | Prahlad et al. |
| 2012/0150949 | A1 | 6/2012 | Vijayan Retnamma et al. |
| 2012/0191670 | A1 | 7/2012 | Kennedy et al. |
| 2012/0278569 | A1 * | 11/2012 | Kawakami et al. ........... 711/162 |
| 2013/0054545 | A1 * | 2/2013 | Anglin et al. ................. 707/693 |
| 2013/0054894 | A1 * | 2/2013 | Kawaguchi ................... 711/117 |
| 2013/0159648 | A1 * | 6/2013 | Anglin et al. ................. 711/162 |

OTHER PUBLICATIONS

International Search Report and Written Opinion for Application No. PCT/US2013/065715; Applicant: Netapp, Inc.; Date of mailing: Feb. 25, 2014 (12 pages).

* cited by examiner

*Primary Examiner* — Bai D. Vu
(74) *Attorney, Agent, or Firm* — Perkins Coie LLP

(57) ABSTRACT

Methods and apparatuses for efficiently migrating deduplicated data are provided. In one example, a data management system includes a data storage volume, a memory including machine executable instructions, and a computer processor. The data storage volume includes data objects and free storage space. The computer processor executes the instructions to perform deduplication of the data objects and determine migration efficiency metrics for groups of the data objects. Determining the migration efficiency metrics includes determining, for each group, a relationship between the free storage space that will result if the group is migrated from the volume and the resources required to migrate the group from the volume.

28 Claims, 6 Drawing Sheets

|    | F1 | F2 | F3 | F4 | F5 | F6 |
|----|----|----|----|----|----|----|
| F1 | 0  |    |    |    |    |    |
| F2 | 1  | 0  |    |    |    |    |
| F3 | 10 | 0  | 0  |    |    |    |
| F4 | 0  | 0  | 0  | 0  |    |    |
| F5 | 0  | 2  | 0  | 29 | 0  |    |
| F6 | 4  | 0  | 7  | 0  | 0  | 0  |

FIG. 5A

|    | F1   | F2   | F3   | F4   | F5   | F6   |
|----|------|------|------|------|------|------|
| F1 | 0.00 |      |      |      |      |      |
| F2 | 0.04 | 0.00 |      |      |      |      |
| F3 | 0.38 | 0.00 | 0.00 |      |      |      |
| F4 | 0.00 | 0.00 | 0.00 | 0.00 |      |      |
| F5 | 0.00 | 0.03 | 0.00 | 0.91 | 0.00 |      |
| F6 | 0.18 | 0.00 | 0.24 | 0.00 | 0.00 | 0.00 |

FIG. 5B

MIGRATING DEDUPLICATED DATA

TECHNICAL FIELD

Various embodiments of the present application generally relate to the field of managing data storage systems. More specifically, various embodiments of the present application relate to methods and systems for efficiently migrating data that has been deduplicated.

BACKGROUND

The proliferation of computers and computing systems has resulted in a continually growing need for efficient and reliable data storage. Storage servers are often used to manage data and storage related activities. A storage server is a specialized computer that provides storage services related to the organization and storage of data to one or more clients. A storage server typically stores data on writable persistent storage media, such as non-volatile memories and disks. A storage server is configured to operate according to a client/server model of information delivery and may enable many clients or applications to access the data served by the system. A storage server can employ a storage architecture that serves the data with both random and streaming access patterns at either a file level, as in network attached storage (NAS) environments, or at the block level, as in a storage area network (SAN).

In order to more efficiently use the available data storage space in a storage system and/or minimize costs, various techniques are used to compress data or otherwise reduce the amount of physical storage space used by the system. In some cases, a storage system may contain many duplicate instances of the same data. For example, a large presentation file containing multimedia content may be distributed to many employees of a company. Even though each instance of this file is the same, many copies of it may end up being stored throughout the company's data storage system. In another example, two data files, although different, may both contain a subset of data that is the same (i.e., a picture of a product that appears in many different types of marketing and promotional materials).

Data deduplication is one method of removing duplicate instances of data from a storage system. Data deduplication is a technique for eliminating coarse-grained redundant data. When a data deduplication process is performed on data stored in a data storage system, information associated with blocks of data is compared to information associated with other blocks of data stored in the system. When two or more identical blocks of data are identified, the redundant block(s) are deleted or otherwise released from the system. Metadata that was previously associated with the deleted block(s) is modified to point to the one instance of the data block which was not deleted. In this way, multiple files or applications can share the same block of data. The deduplication process saves storage space and resources by coalescing the duplicate data blocks and coordinating the sharing of single instances of common data blocks.

While deduplication is an effective means of making efficient use of available storage space in a data storage system, it also presents unique challenges with respect to making space management decisions for the storage system. Because the deduplication process may result in various levels of data block sharing among files or other types of data objects, it is difficult to determine how much space on the storage system will be freed when a file, or a group of files or other data objects, is migrated or deleted from the storage system. If a group of files or data objects is to be migrated to make more storage space available in the system, the decision about which files or data objects will be included in the group can have a significant impact on the resulting amount of freed storage space. This is due to the data sharing relationships resulting from the deduplication process.

Without methods or tools for understanding these data sharing relationships, storage system administrators have typically selected files, data objects, or groups of data objects for migration using trial and error approaches, because they do not have a reliable way to determine the resulting effect of migrating a particular data object or group of data objects. In one typical approach, the system administrator simply selects some of the largest data objects for migration in an attempt to free storage space. However, selecting the largest data objects for migration may consume significant system resources and network bandwidth without achieving the desired results.

SUMMARY

Methods and apparatuses for performing space management in a deduplicated storage system are introduced here. Techniques are provided for a storage system to determine migration efficiency metrics for files or other data objects in a data storage volume in which a deduplication operation has been performed. When files or data objects are to be migrated from a data storage volume, the migration efficiency metric indicates potential results of migrating particular files or data objects and can be used to select the files or data objects for migration. The migration efficiency metric for a file, a data object, or a group of data objects corresponds to a relationship between the storage space that will be freed by moving the object(s) and the amount of data transfer required to migrate the object(s) to a new location.

The migration efficiency metric provides a quantitative tool for use in selecting data objects, including deduplicated data objects, of a data storage system for migration. The amount of storage space that will be freed by migrating a data object and the resources required to migrate it may not be able to be determined from the logical object size alone due to the data sharing relationships associated with deduplication. The migration efficiency metric accounts for the data sharing relationships and allows relative efficiency comparisons to be made between data objects, or groups of data objects, for use in determining which data objects, or groups, should be migrated.

In one simple example, two large files share a large number of data blocks because a deduplication process has taken advantage of the fact that two files had duplicate blocks. Migrating only one of these files from the source storage system to a destination storage system may be relatively inefficient, as compared to other options, because only a relatively small amount of storage space will be freed by migrating the file. This is because all of the blocks of data shared by the two files must remain in the source storage system in conjunction with the file that is not being migrated. The resulting amount of freed storage space may only be equivalent to a small percentage of the size of the migrated file. At the same time, system and network resources are also needed used to transfer all of the shared blocks to the new location in conjunction with the file that is being migrated. The logical size of the file is not necessarily representative of the potential space savings associated with migrating it to a new location. Similarly, the benefits associated with migrating or deleting a group of files can depend on how files are grouped and the file sharing relationships among the group of files. Returning to the example above, significantly more storage space can be freed if the two files are both migrated because they share a large number of data blocks.

Many of the examples and techniques provided herein are described with respect to identification, selection, and migration of files. However, these examples and techniques may also be applied to other types of data objects including directories, subdirectories, logical units (LUNs), or other types of logical containers. The techniques introduced here are not to be limited to any particular type of data object.

In one exemplary embodiment of the disclosed techniques a method is provided. The method includes maintaining a data storage volume that includes files and free storage space, where a deduplication operation has been performed on the data storage volume. The method also includes computing a migration efficiency metric for subsets of the files, where each migration efficiency metric is based on a relationship between an increase in an amount of free storage space that will result in the volume if the associated subset of files is migrated from the volume to a destination and an amount of data transfer required to migrate the associated subset of files. In some cases, the method may also include making a migration decision based on the migration efficiency metrics.

In another exemplary embodiment of the disclosed techniques, a data management system includes a data storage volume, a memory including machine executable instructions, and a computer processor. The data storage volume includes files and free storage space. The computer processor executes the instructions to perform deduplication of the files and determine migration efficiency metrics for groups of the files. Determining the migration efficiency metrics includes determining, for each group, a relationship between the free storage space that will result if the group is migrated from the volume and the resources required to migrate the group from the volume.

The processes for determining which files to include in a group to migrate become significantly more complex when a larger number of files with more complex data sharing relationships are considered. The techniques described here may be scaled and applied to data storage systems of many different types, sizes, and complexities.

Embodiments introduced here also include other methods, systems with various components, and non-transitory machine-readable storage media storing instructions which, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the disclosed techniques. As will be realized, the invention is capable of modifications in various aspects, all without departing from the scope of the techniques introduced here. Accordingly, the drawings and detailed description are to be regarded as illustrative in nature and not restrictive.

BRIEF DESCRIPTION OF THE DRAWINGS

Embodiments of the techniques disclosed herein will be described and explained through the use of the accompanying drawings in which:

FIG. 5A illustrates an example of a pairwise similarity matrix that indicates data sharing relationships among files based on number of shared blocks;

FIG. 5B illustrates an example of a pairwise similarity matrix that indicates data sharing relationships among files based on similarity scores.

Figure 1:
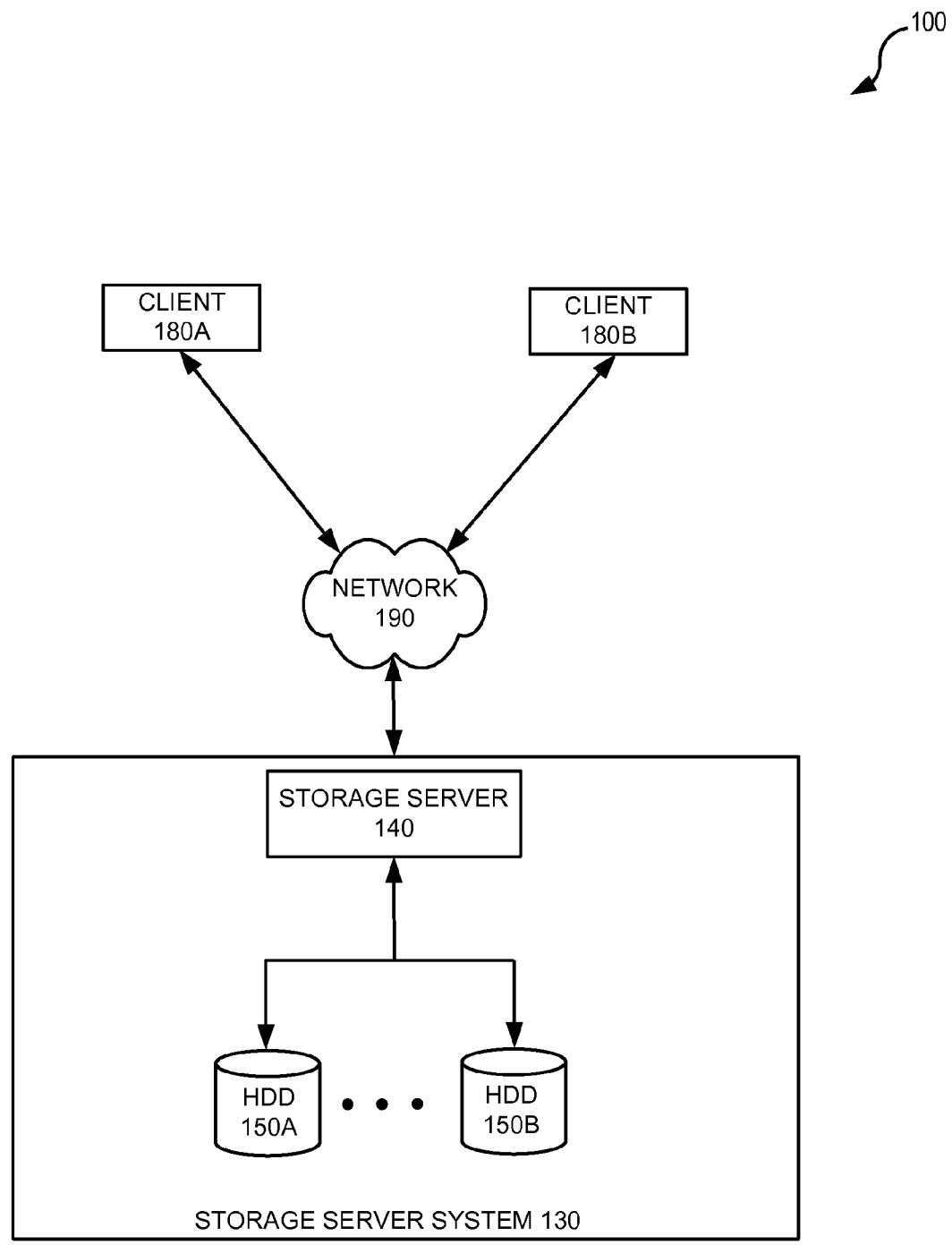
FIG. 1 illustrates an operating environment in which at least some embodiments of the disclosed techniques may be utilized.

The drawings have not necessarily been drawn to scale. For example, the dimensions of some of the elements in the figures may be expanded or reduced to help improve the understanding of the embodiments of the solution introduced here. Similarly, some components and/or operations may be separated into different blocks or combined into a single block for the purposes of discussion of some of the embodiments of the solution introduced here. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Data deduplication makes more efficient use of the available storage space in a data storage system by creating relationships between files that did not previously exist. These relationships present unique challenges when managing data storage systems. For example, the logical size of a deduplicated file may not be indicative of the amount of physical storage space in the system that is individually dedicated to that file. Consequently, the logical size of the file may not indicate the amount of physical storage space that can be made available in the system if the file is migrated to another location or deleted.

The complexities associated with the data sharing relationships described above are compounded when attempting to understand the effect of the data sharing relationships with respect to groups of files. The grouping of files for migration to a new location can have a significant effect on how much storage space is freed as a result of the migration, as well as on the amount of system resources needed to perform the migration. These complexities are further compounded when considering systems containing many thousands of files having various levels of data sharing relationships.

System managers currently do not have effective tools or methods for understanding and assessing the effects of these types of data sharing relationships. Since it is difficult to understand the effects of migrating particular files, trial and error approaches are often used. System administrators often select files or groups of files for migration randomly because they lack a tool that provides a picture of the data sharing relationships across deduplicated files. In some cases, migration may be performed and then reversed because it did not yield the desired results. These trial and error and random approaches can consume significant time, effort, and system resources and, in some cases, may not accomplish the intended objective.

Even in situations where there is plenty of free storage space available in a data storage system, there may be a desire to migrate files to another storage system, or another part of the storage system, for other reasons. For example, in a clustered storage system one volume may be over-utilized while other volumes are under-utilized. The over-utilized volume may not be able to serve reads and/or writes at sufficient rates. Therefore, it may be desirable to load balance the system by migrating some of the files to another volume of the system. The data sharing relationships between the files and the decisions about which files to migrate affect not only the resources necessary to migrate the files but can also affect the ongoing performance of the system after the migration is complete.

The techniques introduced here address these and other problems by providing methods and systems for performing migration processes in deduplicated data storage systems based on migration efficiency metrics. When files are to be migrated from or deleted from a data storage system, the migration efficiency metrics are used to assess the potential outcomes associated with migrating particular files or groups of files. The migration efficiency metric for a file or a group of files is a relationship between the storage space that will be freed by moving the file(s) and the amount of data transfer required to migrate the file(s) to a new location. The techniques introduced here also include methods of identifying files that should be grouped together to achieve improved migration efficiency metrics.

In some cases, files are grouped based on data sharing relationships between the files. The data sharing relationships may be determined in various ways including: analyzing a tree data structure containing hierarchical clustering relationships of the files, analyzing fingerprint data associated with the deduplication process, determining pairwise similarities for the files, and/or generating various types of similarity matrices for the files.

As used herein, a "block" of data is a contiguous set of data of a known length starting at a particular address value. In certain embodiments, each block is 4 kBytes in length. However, in any particular implementation a block could be defined to have another size or sizes.

FIG. 1 illustrates an operating environment 100 in which some embodiments of the solution introduced here may be utilized. Operating environment 100 includes storage server system 130, client 180A, client 180B, and network 190.

Storage server system 130 includes storage server 140, HDD 150A, and HDD 150B. Storage server system 130 may also include other devices or storage components of different types which are used to manage, contain, or provide access to data or data storage resources. Storage server 140 is a computing device that includes a storage operating system that implements one or more file systems. Storage server 140 may be a server-class computer that provides storage services relating to the organization of information on writable, persistent storage media such as HDD 150A and HDD 150B. HDD 150A and HDD 150B are hard disk drives. Storage server system 130 may also include other types of storage devices or memory including solid state drives (SSDs), tape drives, optical drives, and flash memory. A typical storage server system will include many more HDDs or other storage devices than are illustrated in FIG. 1. Storage server system 130 is illustrated as a monolithic system, but could include systems or devices which are distributed among various geographic locations. Storage server system 130 may also include additional storage servers which operate using storage operating systems which are the same or different from storage server 140.

Storage server 140 provides data storage services for clients such as client 180A and client 180B. In order to make more efficient use of the storage space available in HDD 150A and HDD 150B, storage server 140 performs deduplication on data stored therein. The techniques introduced herein are used to determine migration efficiencies for the deduplicated data. The migration efficiencies can be used to make migration decisions regarding the deduplicated data. The techniques and the teachings of this description can be adapted to a variety of storage server architectures including, but not limited to, network-attached storage (NAS), a storage area network (SAN), a disk assembly directly-attached to a client or host computer, an individual disk with a disk controller, or to another type of storage device. The term "storage server" should therefore be taken broadly to include such arrangements.

Figure 2:
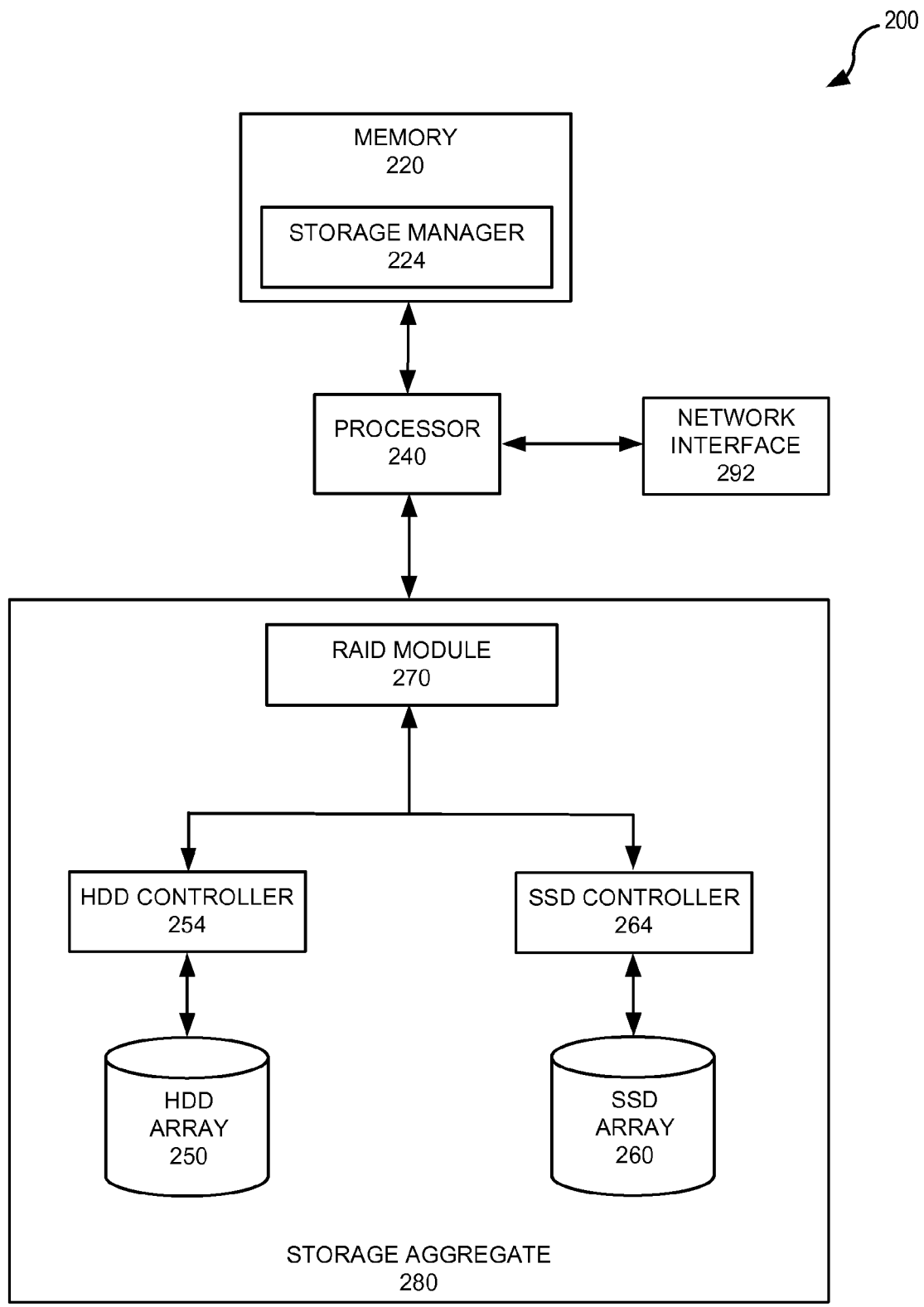
FIG. 2 illustrates a storage system in which at least some embodiments of the disclosed techniques may be utilized.

FIG. 2 illustrates storage system 200 in which some of the techniques introduced here may also be utilized. Storage system 200 can be an embodiment of storage server system 130 in FIG. 1. Storage system 200 includes memory 220, processor 240, network interface 292, and storage aggregate 280. Storage aggregate 280 includes HDD array 250, HDD controller 254, SSD array 260, SSD controller 264, and redundant array of independent disks (RAID) module 270. HDD array 250 and SSD array 260 are heterogeneous tiers of persistent storage media. The embodiments described herein are not limited to the HDD/SSD configuration illustrated and are not limited to implementations which have only two types of storage media.

HDD array 250 and/or SSD array 260 may each be a collection of RAID groups which may include one or more volumes. RAID module 270 organizes the HDDs and SSDs within a particular volume as one or more parity groups (e.g., RAID groups) and manages placement of data on the HDDs and SSDs. RAID module 270 further configures RAID groups according to one or more RAID implementations to provide protection in the event of failure of one or more of the HDDs or SSDs. The RAID implementation enhances the reliability and integrity of data storage through the writing of data "stripes" across a given number of HDDs and/or SSDs in a RAID group including redundant information (e.g., parity). HDD controller 254 and SSD controller 264 perform low level management of the data which is distributed across multiple physical devices in their respective arrays. RAID module 270 uses HDD controller 254 and SSD controller 264 to respond to requests for access to data in HDD array 250 and SSD array 260.

Memory 220 includes storage locations that are addressable by processor 240 for storing software programs and data structures to carry out the techniques described herein. Processor 240 includes circuitry configured to execute the software programs and manipulate the data structures. Storage manager 224 is one example of this type of software program. Storage manager 224 directs processor 240 to, among other things, implement one or more file systems. Processor 240 is also interconnected to network interface 292. Network interface 292 enables other devices or systems to access data in storage aggregate 280. In one embodiment, processor 240 performs one or more of the techniques and methods described herein on data stored in one or more of HDD array 250 and SSD array 260.

Figure 3:
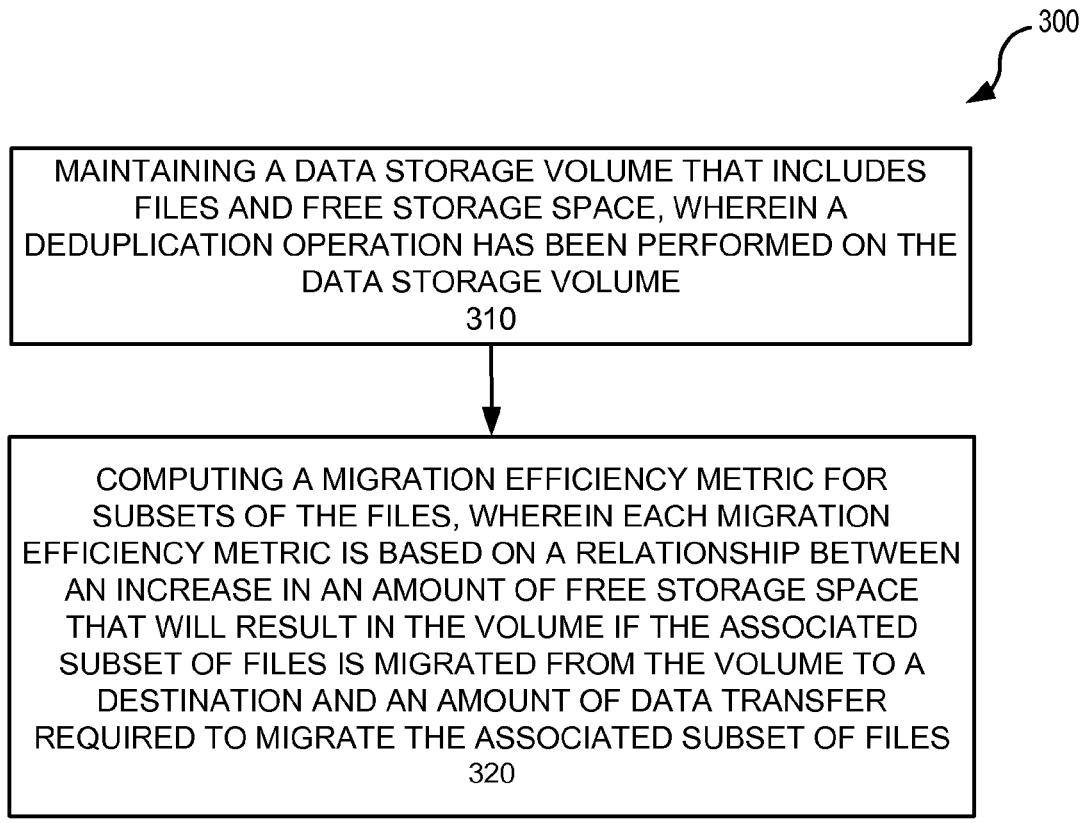
FIG. 3 illustrates an example of a method of making a data migration determination.

FIG. 3 illustrates one example of a method 300 that may be performed by processor 240, storage server 140, client 180A, client 180B, or another processing device, in accordance with the technique introduced here. Step 310 includes maintaining a data storage volume that has been deduplicated and includes files and free storage space. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more files, directories, subdirectories, logical units (LUNs), or other types of logical containers. The deduplication may be performed on all of the files in the volume or on a subset of the files.

At step 320, the processing device computes a migration efficiency metric for subsets of the files. A subset may contain an individual file or a group of files. The migration efficiency metric includes a relationship between an increase in an amount of the free storage space that will result if the subset of the files is migrated from the volume to a destination and an amount of data transfer that would be required to migrate the subset of files to another location. If no deduplication had been performed, the migration efficiency metric for each of files would be essentially the same because the amount of storage space freed by migrating the file would be approximately the same as the amount of data transfer required to migrate the file. However, this is often not true in the case of deduplicated files because of the data sharing (i.e., block sharing) relationships that exist between the files.

Some embodiments of the techniques introduced here may include making a migration decision based on the migration efficiency metrics. Making the migration decision may include selecting specific files or subsets of files to be included in groups for migration based on the migration efficiencies of the groups of files.

In other embodiments of the techniques introduced here, a migration decision includes a decision to migrate files, to delete files, or a combination thereof.

Figure 4:
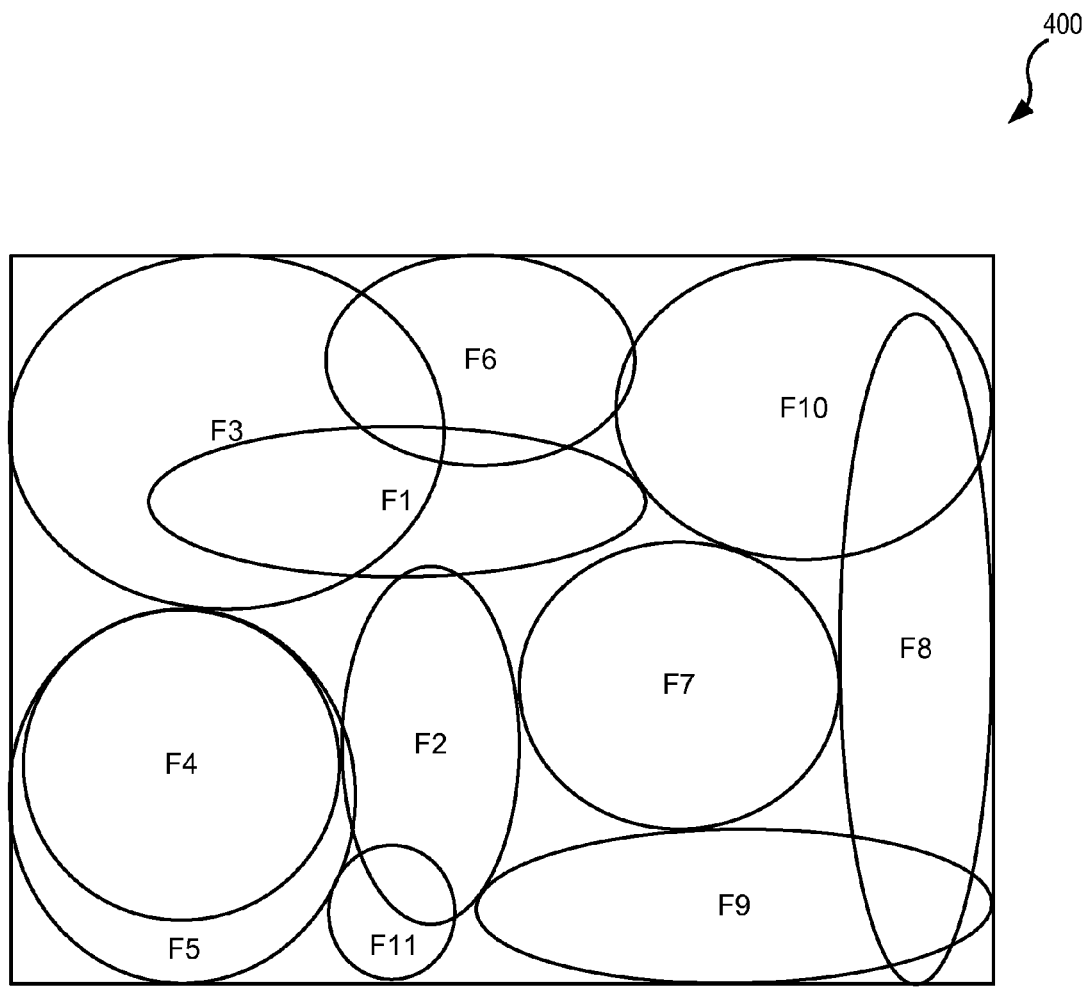
FIG. 4 illustrates an example of grouping of files for determining migration efficiencies.

FIG. 4 illustrates an example of grouping of files for determining migration efficiencies in accordance with techniques introduced here. In FIG. 4, volume 400 includes eleven files labeled F1-F11. A typical volume will include many more files; a small number of files is shown only for purposes of illustration. FIG. 4 is not a representation of how the files are physically stored on the storage media which makes up volume 400. In some cases, portions of a file will be stored in non-contiguous physical locations of the storage media. Instead of illustrating a physical layout of the files, FIG. 4 illustrates the data sharing relationships between the files. Overlap of files in FIG. 4 indicates that the files share one or more data blocks as a result of a deduplication process that was performed on the volume. For example, files F8 and F10 share data blocks. Some data blocks are shared by more than two files. For example, some of the data blocks are shared by various combinations of files F1, F3, and F6 as represented by the overlap of the three in FIG. 4. The amount of overlap is representative of the number of data blocks shared by the files. For example, file F2 shares a larger number of data blocks with file F11 than it does with file F5. Much more complex file structures and data sharing relationships are possible.

A need may arise to free storage space in volume 400 or to migrate files from volume 400 for other reasons (i.e., for load balancing). Because volume 400 has been deduplicated, logical file sizes cannot be used to determine how much storage space will be freed by migrating or deleting files from the volume. For example, if F5 was chosen to be migrated or deleted, the amount of freed storage space would be much smaller than the logical file size of F5. This is the case because F5 shares data blocks with F2 and F4. If F2 and F4 are not also migrated or deleted at the same time, the data blocks F5 shares with F2 and F4 must remain in volume 400 such that F2 and F4 are still complete.

Consequently, selecting F5 for migration, without selecting the other files, will only free space equivalent to a small fraction of the logical size of F5. However, despite the relatively small realization of free storage space associated with migrating F5 alone, the data transfer required to migrate F5 will be roughly equal to the logical size of F5. This is the case because the data blocks that F5 shares with F2 and F4 will also have to be migrated to the destination in order to complete F5 at the destination, even though they will also still remain in volume 400. Stated differently, migrating only a subset of a group of files that have become related to each other through deduplication inherently includes inefficiencies, because the previously shared data blocks must remain present in the volume as well as be transferred to the destination.

However, in the example above, if both F4 and F5 are migrated, a high percentage of the associated storage space will be freed in volume 400. Because both F4 and F5 will be migrated, the storage space associated with the data blocks that are shared between F4 and F5 will be freed. In addition, even though both F4 and F5 utilize the shared blocks, the shared blocks may only need to be transmitted once if F4 and F5 are being migrated to the same destination at the same time. In this example, the only storage space associated with F4 and F5 that will not be freed when F4 and F5 are migrated is the storage space associated with the blocks shared between F2 and F5. Migrating F2 in addition to F4 and F5 would also free the storage space associated with the blocks shared by F2 and F5 and would also free much of the other storage space associated with F2. However, doing so would not free the storage space associated with the blocks F2 shares with F1 and F11 if these files are not migrated at the same time.

Migration efficiency is a metric that represents, corresponds to and/or is a function of a relationship between the amount of space free resulting from migrating one or more files and the amount of data transfer required to migrate those one or more files. In some cases, the migration efficiency may be referred to as migration utility (MU), where MU is a function of space saving (S) and cost of migration (C). S is the difference in the total available physical size of the volume, in data units, before and after migrating one or more files. C is the number of data units that must be transferred from the volume to a destination in order to migrate the one or more files. MU is a metric indicating the amount of space saving achieved for every byte, or other data unit, transferred over a network to the destination. Ideally, MU equals one but will often be less than one due the block sharing relationships described above. In one implementation, $$MU = S/C.$$

In many cases, more than two files will be migrated from a volume in order to free storage space on the volume. A migration may include moving thousands of files. As illustrated in the examples discussed above, the selection and grouping of files can have a significant impact on the efficiency of the migration and the amount of space freed as a result of the migration. In some embodiments of the techniques introduced here, making a migration determination includes selecting subsets or groups of files that will be migrated together. In order to maximize the efficiency of the migration process, files having data sharing relationships should, generally, be grouped together. More specifically, files having the most extensive data sharing relationships should be grouped together. Migration efficiencies or migration utilities may be determined for the groups of files in a manner similar to that for individual files.

FIG. 4 also illustrates potential groupings of the files of volume 400. Group A includes files F1, F3, and F6. Grouping these files together for migration is beneficial because they share a relatively large number of data blocks. If they are not migrated together, the migration of only one or two of them will have lower efficiency due to the fact that some of the shared data blocks will have to remain in volume 400. Similarly, F4 and F5 should be grouped because migrating F4 alone would free no storage space and migrating F5 alone would free only a relatively small amount of storage space. File F7 is in group D alone because F7 shares no data blocks with any other file and there will be no efficiency gain associated with grouping F7 with any other file or group of files. F7, by itself, already has the highest possible MU and its migration efficiency cannot be increased by grouping it with other files.

Using the techniques described herein, migration efficiencies can be determined for individual files. In addition, groups of files can be identified that have similarities and migration efficiencies can be determined for those groups of files. Because the files in those groups have similarities, the migration efficiencies for those groups will typically be higher than the migration efficiency for a group of files which have no similarities or shared blocks among them. However, in systems with many files and various levels of inter-file relationships, the task of grouping the files can become more complex. It is generally not practical to include in a group every file that has any kind of sharing relationship with another file of the group. This is illustrated by the groupings of FIG. 4. Files F6 and F10 are not included in the same group even though they have a file sharing relationship. If they were, Group A and Group C would be combined into a single group. Using this same approach Group A and Group E would also be combined due to the sharing of blocks between F1 and F2. Carried further, Group B would also be combined due to the sharing between F2 and F5. The result would be one large group that contained all of the files except F7.

In some cases, a deduplication process is performed by generating fingerprints for each of the data blocks. In some implementations, a fingerprint is a hash of the block's data. Two blocks that have matching fingerprints are candidates for block sharing in the deduplication process. In addition to being used to perform the deduplication process, the fingerprints and associated fingerprint data can also be used to identify the data sharing relationships for grouping files into migration groups. Generally, the files which have the closest data sharing relationships should be grouped together. This type of grouping generally frees more data storage space on the data storage system that the files are being migrated from relative to the amount of data transfer bandwidth required to migrate the group of files.

In one example of using the fingerprint data to determine the data sharing relationships, a list of records of the format {fp, f} is used, where fp is the fingerprint present in a file f. A list of tuples <fi, fj, s> is generated, where s is the similarity score for files fi & fj. The list can be generated using the following process:

1. Sort the input fingerprint database (fpdb) listing in fingerprint order.
2. Scan the sorted fpdb, and collect every consecutive pair of file IDs that share a fingerprint, to produce a listing as follows: $<f_a, f_b>, <f_c, f_d>$ (the file pair $<f_a, f_b>$ repeats as many times in the list as the number of common fingerprints between them).
3. Sort the above listing and combine consecutive identical file pairs to produce a listing of file pairs with counts as follows: $<f_i, f_j, c_k>, <f_p, f_q, c_r>$, where $c_k$ is the number of times the pair $<f_i, f_j>$ occurs in the listing of the above step.
4. For each file id pair $<f_i, f_j, c_k>$ in the list obtained from the above step, the similarity score can be computed as follows:

$$S(f_i, f_j) = c_k * \text{Block Size} / (\text{size of } f_i + \text{size of } f_j - c_k * \text{Block Size}).$$

The calculation above provides a normalized score, a value that is in the range zero to one.

In another example, a similarity score may be determined as follows:

$$S(f_i, f_j) = c_k * \text{Block Size}.$$

In some cases, the block size may be a fixed value. In other cases, block size may vary depending on characteristics of the deduplication. For example, in a variable length deduplication system, fingerprints may be associated with variable length data blocks. In these cases, "block size" in the equations above may be the average block size.

Using the pair wise file similarities S(fi, fj), hierarchical algorithms may be used to produce a dendrogram. A dendrogram is a hierarchical binary tree of nodes that illustrates hierarchical clustering and is created by identifying file analyzing relationships. Each node of the dendrogram represents a cluster and its variables. A cluster is a set of files. Each node, except the root node, has one parent node in which the node is referred to as the child node. Likewise, each node has two children, except the leaf nodes which have zero children. The leaf nodes represent singleton clusters, or clusters with just one member. Each internal node also represents a cluster whose members are the files represented by the leaf nodes contained within the subtree headed by that node. For example, the root node contains all the leaf nodes and represents a cluster whose members are all of the files in the system.

Algorithm 1 below illustrates determining space saving (S) and cost of migration (C) factors for nodes or clusters of files in a dendrogram. The union of the set of fingerprints for all the files that are members of the cluster is the complete unique set of fingerprints that belong to that cluster. The size of this set is referred to as "Population." Population is representative of the number of unique data blocks that have to be transferred out a container for a migration and is indicative of the cost of the migration. "Shared" represents the number of fingerprints that belong to the cluster and also belong to some file outside the cluster. Therefore, Shared is associated with those data blocks that cannot be freed by migrating the cluster because the data blocks are still utilized by some files outside the cluster. Therefore, the space savings obtained by migrating this cluster is Population−Shared.

In Algorithm 1, a fingerprint database is scanned. A list of the files associated with a single fingerprint is identified and the dendrogram is updated accordingly. The Population for each node is determined by counting the number of unique fingerprints present in any file belonging to the cluster. This is obtained through an upward traversal of the dendrogram starting from the leaf nodes (L) representing the files associated with the fingerprint. A priority queue may be used for the upward traversal of the tree. The space savings (S) of any cluster or dataset is the number of its member fingerprints that are not shared with the remainder of the dataset. Therefore, S=Population−Shared.

Algorithm 1: Computing S and C for a cluster

```
For each fingerprint "fp" in FPDB do
    |    L= { Set of leaf nodes (files) containing fp };
    |    A= { Least Common Ancestor of nodes in L };
    |    P = { i || i is on the path from j to Root, ∀ j ∈ L };
    |    For each node n in P do
    |    |    n.Population ++;
    |    |    if n is a descendent of A then
    |    |    |    n.Shared ++;
    |    |    end
    |    end
end
    C = n.Population
    S = n.Population − n.Shared
```

Set-theoretic definitions of Population and Shared are as follows:

Population$(C) = |\{fp | fp \in A \text{ and } A \in C\}|$

Shared$(C) = |\{fp | fp \in A, A \in C \text{ and } fp \in B, B \ni C\}|$.

Other algorithms or methods for determining the data sharing relationships are possible and the techniques introduced here are not to be limited to any particular algorithm or method. In some embodiments, a similarity matrix is generated that includes pairwise similarity information for the files in the volume. The pairwise similarity data may be generated using one of the algorithms described above or using another method.

FIG. 5A is one example of a pairwise similarity matrix. The example of FIG. 5A illustrates a pairwise similarity matrix for six files, F1-F6. In practice, a pairwise similarity matrix typically will include entries for many more files. In a volume with N files, the pairwise similarity matrix may include entries for some or all of the files. Therefore, the pairwise similarity matrix will have a size of N×N, or less. Each entry in the matrix indicates a relationship between the two files associated with that position in the matrix. In FIG. 5A, each entry indicates a number of data blocks shared by those two files. For example, files F1 and F3 share 10 data blocks, while files F3 and F4 share no data blocks. This information is used for grouping the files into migration groups that preferably contain files with the most significant data sharing relationships.

FIG. 5B is another example of a pairwise similarity matrix. FIG. 5B is similar to FIG. 5A except that the entries in FIG. 5B are normalized similarity scores each having a range of zero to one. If two files are identical and a deduplication process has taken full advantage of this relationship, the two files will share all of the same data blocks. These two files would have a similarity score of 1. A similarity score of zero indicates that the files share no data blocks. For example, files F4 and F5 have a high similarity score because they share a large number of data blocks while the similarity score for files F2 and F5 is relatively low because they share only a small number of data blocks. As with FIG. 5A, the information of FIG. 5B can be used for grouping the files into migration groups that preferably contain files with the most significant data sharing relationships.

In many cases, migration is done to free up a percentage of the storage space associated with a volume. If every file having a data relationship with another file is included in a single migration group, the group may become too large to accomplish the migration objective. In some cases, the objective will be to migrate a percentage of the data on the volume that is smaller than a group containing every related file. Therefore, expanding the migration group to include every file with a similarity relationship may not provide migration groups that are suited to accomplish the objective. Therefore, it is desirable to create groups that have limited sizes or target sizes such that these groups can be identified, compared, and/or combined for accomplishing the migration objective.

Pair wise file similarities that are obtained using the techniques described herein can be used to construct a graphical representation of the data. Then, graphical partitioning algorithms may be used to find roughly equal sized file groups with beneficial migration efficiencies. In some cases, the graphical representation could be an undirected graph or a bipartite graph. In the undirected graphical model, files are represented by vertices of a graph and pair wise file similarities are represented as an edge weights across nodes. Graph partitioning algorithms may be used to divide the set of files into roughly equal sized groups, such that the sum of the edge weights across these groups is minimal.

In the undirected graphical model, both files and fingerprints are represented by vertices. Edges are inserted between a fingerprint and the file to which it belongs. Groups of fingerprints that have the same set of neighbors (i.e., files with which they share an edge) may be collapsed into a single vertex for a compressed version of the graph. Graph partitioning is then invoked to produce roughly equal sized files groups such that the sum total of fingerprints that have multiple file groups as neighbors is minimized. For example, groups may be identified which each represent approximately 5% of the storage space on the volume. These groups can then be selected or combined to free varying amounts of space on the volume in 5% increments (i.e., 5%, 10%, 15%, 20%). In some cases, these groups may also be referred to as partitions.

Because the sizes of the groups of files play a role in accomplishing the migration objective, the sizes of the individual files may play a role in determining which files are grouped in addition to the role of data sharing relationships in determining the grouping. For example, if groups which represent approximately K % of the volume are desired, files will be combined into groups starting with the files with the highest similarity scores and working toward lesser similarity scores until the target group size of K % for a particular group is met. While a first group may reach the target size with all of the files having similarity scores at or above a particular value, a second group may not be filled until files having lower similarity scores are brought together in that second group. This approach results in groups having roughly similar sizes which can be considered for migration to accomplish the overall objective to free a designated amount of storage space.

Once the groups are identified, a migration efficiency for each group can be calculated using the methods described above. Groups may also be combined, if needed, to accomplish the overall objective. The migration efficiency of the combination of any two groups will always be the same or greater than the average migration efficiency of the components that make up that group. For two groups, a and b, each has a migration efficiency as follows:

$M_a = S_a / C_a$ and $M_b = S_b / C_b$.

The migration efficiency for a group that is a combination of the groups a and b is:

$M_{ab} = S_{ab} / C_{ab}$.

However, since $S_{ab} >= S_a + S_b$ and $C_{ab} <= C_a + C_b$, the following will always be true:

$$M_{ab} >= \frac{M_a \cdot C_a + M_b \cdot C_b}{C_a + C_b}.$$

In some cases, there may be factors other than migration efficiency which may be used in selecting which files to add to a group or which groups to combine into a larger group. For example, the destination volume of the migration may have a higher latency than the source volume. A service level objective associated with certain files, groups of files, or data sets may be hindered if they are move to the lower latency destination. Therefore, migration decisions may also take into account performance needs or service level objectives (SLOs) associated with the files or the groups of files.

The deduplication factor (D) of a volume is the ratio of the logical size of the data stored in that volume to the physical size of the storage space necessary to store the data in that volume (L/P). If any deduplication has taken place, the logical size of the data stored will be greater than the required physical space and D will be greater than one. Decisions about which file(s) to migrate from a volume, and which files get grouped together for migration, can also have an effect of the resulting deduplication factor for the volume. For example, referring back to FIG. 4, migrating F4 from volume 400 will have a different effect on the deduplication factor for the volume than migrating file F7 (even if F4 and F7 are of the same logical size). Because F7 does not share any data blocks with any other files, migrating F7 would reduce both the logical size and the physical size of volume 400 by approximately the same amount, if not the same amount. Therefore, the deduplication factor for volume 400 would be affected only slightly.

In contrast, migrating F4 from volume from volume 400 would reduce the logical size of volume 400 without reducing the physical size (assuming that F5 is not migrated at the same time). In this case, the deduplication factor for volume 400 will be reduced in an amount corresponding to the logical size of F4. This is true because the logical amount of data stored in volume 400 will have decreased by the logical size of F4 while the physical size of volume 400 will remain largely unchanged. Even if F4 and F7 are of the same logical size, migrating one will affect the deduplication factor differently than migrating the other.

As discussed in previous examples, a group of files designated as group a has a migration efficiency:

$$M_a = S_a/C_a,$$

where $S_a$ is the physical storage space that is being freed by migrating group a. If P is the total occupied physical storage space in a storage cluster, before migration, then the total fraction of the physical storage space, $F_a$, that is freed by the migration is:

$$F_a = S_a/P.$$

Therefore, the global deduplication factor of the clustered storage, that will result after a file or group of files has been migrated can be calculated as follows:

$$D' = D * \left( \frac{M_a}{M_a + F(1 - M_a)} \right).$$

An increased migration efficiency leads to improved global storage efficiency preservation. This because a higher migration efficiency is also associated with a higher change factor:

$$\left( \frac{M_a}{M_a + F(1 - M_a)} \right).$$

For a given migration, a higher change factor is associated with a smaller reduction in the global deduplication factor associated with the migration.

In another example of a method of determining file sharing relationships, a data storage system is queried to obtain virtual block numbers (VBNs) for each of the files contained in a volume. Using the VBNs, block allocation bitmaps are constructed for each of the files. These block allocation bitmaps are then compared pairwise and a pairwise distance (PD) between any two files, F1 and F2, is calculated as follows:

$$PD = 1 - \left[ \left( \frac{\text{(Number of data units shared between } F1 \,\&\, F2)}{\left( \begin{array}{c} \text{Size of } F1 + \text{Size of } F2 - \\ \text{Number of data units shared between } F1 \,\&\, F2 \end{array} \right)} \right) \right]$$

PDs are calculated for combinations of files and normalized to fall in the range of zero to one, with zero implying that the files are copies of each other and one implying that files share no data between them. These values are used to create a distance matrix that is then fed as an input to a clustering process. The clustering is performed using an average-linkage agglomerative hierarchical clustering algorithm. Next, each node of a dendrogram obtained from the agglomerative clustering is recursively analyzed, and the savings and cost associated with its migration are computed. For the space savings and cost calculations, a system generated reference count metafile, populated by de-duplication process is used. The dendrogram is queried to obtain a suitable cluster that satisfies the space savings and cost conditions of the query to satisfy a particular migration need or requirement.

Figure 6:
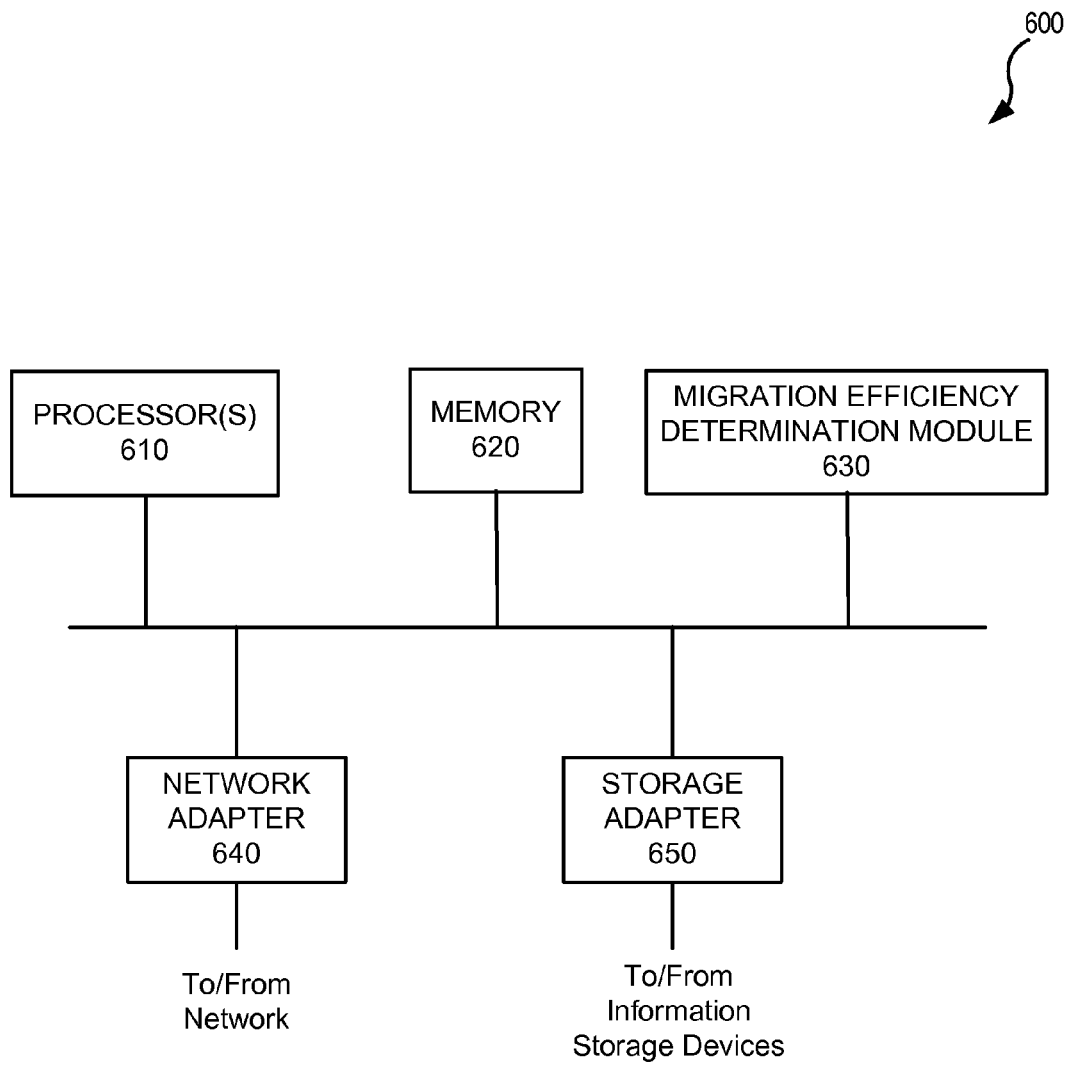
FIG. 6 illustrates a storage server in which at least some embodiments of the disclosed techniques may be utilized.

FIG. 6 illustrates storage server 600 in which at least some embodiments of the disclosed techniques may be utilized. Storage server 600 is one example of storage server 140. Storage server 600 includes one or more processor(s) 610, a memory 620, a migration efficiency determination module 630, a network adapter 640, and a storage adapter 650. Processor(s) 610 may implement storage management functions to logically organize data as a hierarchical structure of named directories, files, and/or data blocks.

Network adapter 640 includes one or more ports to couple storage server 600 with one or more clients, or other storage servers, over point-to-point links, wide area networks, virtual private networks implemented over a public network (Internet), or a shared local area network. Network adapter 640 can include the mechanical components as well as the electrical and signaling circuitry needed to connect storage server 600 to a network. Clients can communicate with storage server 600 over the network by exchanging packets or frames of data according to pre-defined protocols, such as Transmission Control Protocol/Internet Protocol (TCP/IP).

Storage adapter 650 provides an interface to information storage devices. The information storage devices may be any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. Storage adapter 650 includes a plurality of ports having I/O interface circuitry that couples with the storage devices over an I/O interconnect arrangement, such as a conventional high-performance, Fibre Channel link topology.

Memory 620 comprises storage locations that are addressable by processor(s) 610 and adapters 640 and 650 for storing software program code and data associated with the techniques introduced here.

Migration efficiency determination module 630 determines migration efficiency metrics for data objects stored on the information storage devices. The migration efficiency metrics are determined by computing, for a subset of the data objects, a relationship between an increase in an amount of free storage space that will result if the subset of the data objects is migrated from the information storage devices to another location and an amount of data transfer required to migrate the subset of the data objects.

Embodiments of the present techniques include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the solution introduced here may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "the solution," "in some examples," and the like generally mean the particular feature, structure, or characteristic following the phrase is included in at least one embodiment of the solution introduced here, and may be included in more than one embodiment of the solution introduced here. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the solution introduced here is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method comprising:
    maintaining, by a data storage system, a data storage volume that includes a plurality of data objects and free storage space, wherein a deduplication operation has been performed on the data storage volume; and
    computing, by the data storage system, a migration efficiency metric for each of a plurality of subsets of the data objects, wherein each migration efficiency metric is based on a relationship between an increase in an amount of free storage space that will result in the data storage volume in an event the associated subset of the data objects is migrated from the data storage volume to a destination and an amount of data transfer required to migrate the associated subset of the data objects, wherein:
    the increase in the amount of the free storage space that will result in the event the subset of the data objects is migrated is a number of data units on the data storage volume that will be made available in the event the subset of the data objects is migrated;
    the amount of data transfer required to migrate the subset of the data objects is a number of data units must be transferred from the data storage volume to the destination to migrate the subset of the data objects; and
    the migration efficiency metric is a ratio of the number of data units on the data storage volume that will be made available and the number of data units that must be transferred.

2. The method of claim 1 further comprising:
    selecting one of the subsets of the data objects for migration based on the migration efficiency metrics.

3. The method of claim 1 further comprising:
    migrating a subset of the plurality of subsets of the data objects from the data storage volume to the destination based on the migration efficiency metrics.

4. The method of claim 3 wherein migrating the subset from the data storage volume includes deleting the one subset of the data objects.

5. The method of claim 1 wherein a data object of the data objects is included in two or more of the subsets of the data objects.

6. The method of claim 1 further comprising:
    selecting the subsets of the data objects based on data sharing relationships between the data objects.

7. The method of claim 6 wherein selecting the subsets of the data objects based on data sharing relationships between the data objects includes:
    identifying the data sharing relationships between the data objects based on data resulting from the deduplication operation; and
    grouping the data objects into the subsets based on the data sharing relationships.

8. The method of claim 7 wherein identifying the data sharing relationships includes analyzing a tree data structure containing hierarchical clustering relationships of the data objects to determine degrees of data sharing among the data objects.

9. The method of claim 7 wherein:
    identifying the data sharing relationships includes analyzing fingerprint data associated with the deduplication operation to determine pairwise similarities for the data objects and generating a similarity matrix based on the pairwise similarities; and
    grouping the data objects into the subsets based on the data sharing relationships includes organizing similar data objects into the subsets based on the similarity matrix.

10. The method of claim 9 wherein an entry in the similarity matrix is associated with two of the data objects and contains a count of blocks shared by the two data objects.

11. The method of claim 1 wherein the data storage system includes a network storage server.

12. A data management system comprising:
a memory including machine executable instructions;
a data storage volume that includes a plurality of data objects and free storage space; and
a computer processor configured to execute the instructions to:
perform deduplication on the data objects; and
determine a migration efficiency metric for each of a plurality of groups of the data objects by determining, for each group of the groups, a relationship between an increase in an amount of the free storage space that will result in an event the group is migrated from the data storage volume and an amount of data transfer required to migrate the group from the data storage volume, wherein:
the increase in the amount of the free storage space that will result in the event the group of the data objects is migrated is a number of storage bytes in the data storage volume that will be made available in the event the group is migrated;
the amount of data transfer required to migrate the group of the data objects is a number of bytes that must be transferred from the data storage volume to migrate the group of the data objects; and
the migration efficiency metric is a ratio of the number of storage bytes on the data storage volume that will be made available and the number of bytes that must be transferred.

13. The data management system of claim 12 wherein the computer processor is further configured to execute the instructions to generate a migration plan by selecting one of the groups of the data objects for migration based on the migration efficiencies.

14. The data management system of claim 13 wherein the selection of the one group is further based on a target size for the groups of the data objects.

15. The data management system of claim 12 wherein the computer processor further executes the instructions to migrate one of the groups of the data objects from the data storage volume based on the migration plan.

16. The data management system of claim 12 wherein one of the data objects is included in two or more of the groups of the data objects.

17. The data management system of claim 12 wherein the computer processor further executes the instructions to:
identify data sharing relationships between the data objects resulting from the deduplication; and
select the groups based on the data sharing relationships.

18. The data management system of claim 17 wherein to identify the data sharing relationships includes to analyze a tree data structure containing hierarchical cluster relationships of the data objects to determine degrees of data sharing among the data objects.

19. The data management system of claim 17 wherein:
to identify the data sharing relationships includes to:
analyze fingerprint data resulting from the deduplication operation to obtain pairwise similarities for the data objects; and
generate a similarity matrix for the data storage volume based on the pairwise similarities; and
to select the groups based on the data sharing relationships includes to:
arrange similar data objects into the groups based on the similarity matrix and based on a target size for the groups.

20. The data management system of claim 19 wherein an entry in the similarity matrix is associated with two of the data objects and contains one of: a normalized similarity score for the two data objects in the range of zero to one or a count of blocks shared by the two data objects.

21. The data management system of claim 12 wherein the data management system includes a network storage server operating in a Network Attached Storage (NAS) environment or in a Storage Area Network (SAN).

22. A non-transitory machine-readable medium comprising instructions that, when executed by one or more processors, direct the one or more processors to:
access a data storage volume that includes files and unused storage space, wherein a deduplication operation has been performed on the data storage volume;
aggregate the files into groups based on data sharing relationships between the files that result from the deduplication;
determine a migration utility metric for each of the groups by determining a relationship between an increase in an amount of the unused storage space that will result in an event the group is migrated from the data storage volume and an amount of data transfer required to migrate the group from the data storage volume; and
select one of the groups for migration based on the migration utility metric.

23. The non-transitory machine-readable medium of claim 22 wherein the aggregation is further based on a target size for the groups of the files.

24. The non-transitory machine-readable medium of claim 22 wherein the instructions further direct the one or more processors to migrate the selected group from the data storage volume to a destination.

25. The non-transitory machine-readable medium of claim 22 wherein one of the files is included in two or more of the groups.

26. The non-transitory machine-readable medium of claim 22 wherein:
the increase in the amount of the unused storage space that will result in the event the group is migrated is an increase in a number of data units of the unused storage space that will become available in the event the group is migrated;
the amount of data transfer required to migrate the group of files is a number of data units that must be transferred from the data storage volume to migrate the group; and
the migration utility metric is a ratio of the increase in the number of data units of the unused storage space and the number of data units that must be transferred.

27. The non-transitory machine-readable medium of claim 22 wherein to aggregate based on the data sharing relationships includes to analyze a dendrogram of relationships between the files that is generated based on fingerprint data associated with the deduplication operation.

28. The non-transitory machine-readable medium of claim 22 wherein to aggregate the files into groups based on the data sharing relationships includes to:
analyze fingerprint data associated with the deduplication operation to obtain pairwise similarities for N of the files;
generate an N×N similarity matrix based on the pairwise similarities; and
iteratively group similar files based on the N×N similarity matrix, until the groups reach a desired group size.

* * * * *